US010228385B2

(12) United States Patent
Kameta

(10) Patent No.: US 10,228,385 B2
(45) Date of Patent: Mar. 12, 2019

(54) SUBSTRATE FOR SENSOR, PHYSICAL QUANTITY DETECTION SENSOR, ACCELERATION SENSOR, ELECTRONIC APPARATUS, AND MOVING OBJECT

(71) Applicant: Seiko Epson Corporation, Tokyo (JP)

(72) Inventor: Takahiro Kameta, Okaya (JP)

(73) Assignee: Seiko Epson Corporation (JP)

( * ) Notice: Subject to any disclaimer, the term of this patent is extended or adjusted under 35 U.S.C. 154(b) by 251 days.

(21) Appl. No.: 15/381,574

(22) Filed: Dec. 16, 2016

(65) Prior Publication Data
US 2017/0184626 A1 Jun. 29, 2017

(30) Foreign Application Priority Data
Dec. 28, 2015 (JP) ................................ 2015-256059

(51) Int. Cl.
G01P 15/097 (2006.01)
G01P 15/09 (2006.01)
G01P 15/08 (2006.01)

(52) U.S. Cl.
CPC ........ G01P 15/0907 (2013.01); G01P 15/097 (2013.01); *G01P 2015/0871* (2013.01)

(58) Field of Classification Search
CPC .................. G01P 15/097; G01P 2015/0871
See application file for complete search history.

(56) References Cited

U.S. PATENT DOCUMENTS

2012/0227274 A1 9/2012 Watanabe et al.
2013/0192370 A1* 8/2013 Yoda ....................... G01P 15/02
73/514.01

FOREIGN PATENT DOCUMENTS

JP 2000-338124 A 12/2000
JP 2012-189480 A 10/2012

* cited by examiner

*Primary Examiner* — John E Chapman, Jr.
(74) *Attorney, Agent, or Firm* — Harness, Dickey & Pierce, P.L.C.

(57) ABSTRACT

A substrate for a sensor includes: a base section; a movable section connected to the base section; an arm portion as a support portion extending along the movable section from the base section; a first gap portion having a protrusion portion in which one of the movable section and the arm portion protrudes toward the other of the movable section and the arm portion, and having a predetermined gap between the protrusion portion on one side and the other of the movable section and the support portion; and a second gap portion which is located further toward the base section side than the first gap portion has a gap wider than the predetermined gap, in which in the first gap portion, one of the movable section and the arm portion has a ridge portion on the side facing the first gap portion.

20 Claims, 11 Drawing Sheets

SUBSTRATE FOR SENSOR, PHYSICAL QUANTITY DETECTION SENSOR, ACCELERATION SENSOR, ELECTRONIC APPARATUS, AND MOVING OBJECT

BACKGROUND

1. Technical Field

The present invention relates to a substrate for a sensor, a physical quantity detection sensor, an acceleration sensor, an electronic apparatus, and a moving object.

2. Related Art

In the related art, for example, as described in JP-A-2012-189480, a physical quantity detection sensor is known in which a physical quantity detection element for detecting a physical quantity is fixed to a substrate for a sensor (a cantilever section) having a base section (a fixed section), a movable section connected to the base section, and a support portion extending along the movable section from the base section when viewed in a planar view as viewed from a thickness direction of the movable section. In the physical quantity detection sensor, the physical quantity detection element is fixed, at one end thereof, to the base section and fixed, at the other end thereof, to the movable section. Further, the physical quantity detection sensor is provided with a mass section disposed on at least one of both principal surfaces of the movable section and disposed so as to partially overlap the support portion when viewed in the planar view.

In the physical quantity detection sensor having such a configuration, in a case where impact exceeding a design value is applied thereto, if the displacement of the movable section is increased beyond a design value, the movable section strongly comes into contact with an undesirable place, or stress is applied to a connection portion between the movable section and the base section, whereby there is a concern that the substrate for a sensor or the physical quantity detection element may be broken. In order to avoid this problem, the physical quantity detection sensor of JP-A-2012-189480 has a configuration in which a predetermined gap is provided between the mass section and the support portion at an area where the mass section and the support portion overlap, when viewed in a planar view as viewed from a thickness direction of the substrate for a sensor. In this way, when a physical quantity (for example, acceleration) in a thickness direction (a Z direction) is applied to the physical quantity detection sensor, the displacement of the movable section which is displaced according to acceleration can be restricted due to the mass section disposed on a principal surface of the movable section coming into contact with the support portion when the mass section has been displaced by an amount corresponding to the predetermined gap.

Further, in JP-A-2000-338124, there is introduced a physical quantity detection sensor (a semiconductor acceleration sensor) in which at a portion of the inner peripheral surface of a support portion extending along a movable section from a base section when viewed in a planar view as viewed from a thickness direction of the movable section, a protrusion portion (a stopper portion) which makes the distance between the inner peripheral surface of the support portion and the movable section (a weight section) smaller than at other sites is provided to protrude. Due to this configuration, when a physical quantity in a direction intersecting a thickness direction (an in-plane direction of the movable section and the support portion) is applied to the physical quantity detection sensor, the displacement of the movable section (the weight section) which is displaced according to the physical quantity is restricted by the protrusion portion provided to protrude on the inner peripheral surface of the support portion, whereby excessive displacement of the movable section (the weight section) is restricted, and thus it is possible to prevent breakage of a substrate for a sensor or a physical quantity detection element.

In the physical quantity detection sensors of JP-A-2012-189480 and JP-A-2000-338124 described above, substrate for a sensor having base section, movable section, and support portion is integrally formed by etching a single crystal material such as quartz crystal or silicon.

In a case of forming the outer shape of the substrate for a sensor of the physical quantity detection sensor by wet-etching quartz crystal among single crystal materials which are used as a material for forming the substrate for a sensor, it is known that because of etching anisotropy due to a difference in etching rate in the respective crystal axis directions of the quartz crystal, it is difficult to accurately form a gap in the in-plane direction of the movable section and the support portion at a desired length. However, in JP-A-2000-338124, a method or the like of accurately forming the gap between the movable section and the protrusion portion on the inner peripheral surface of the support portion is not described at all. For this reason, the gap between the movable section and the protrusion portion (a restricting portion or a stopper portion) becomes longer than a predetermined length, and thus, in a case where impact exceeding a design value is applied to the physical quantity detection sensor, there is a concern that the substrate for a sensor or the physical quantity detection element may be broken. Further, in a case where the gap between the movable section and the protrusion portion (the restricting portion) becomes shorter than an appropriate length, the displacement range of the movable section is restricted to be smaller than in the settings, and therefore, there is a concern that the set detection range of a physical quantity such as acceleration may not be able to be satisfied.

SUMMARY

An advantage of some aspects of the invention is to solve at least a part of the problems described above, and the invention can be implemented as the following aspects or application examples.

Application Example 1

A substrate for a sensor according to this application example includes: abase section; a movable section connected to the base section; a support portion which extends along the movable section from the base section when viewed in a planar view as viewed from a thickness direction of the movable section; a first gap portion having a protrusion portion in which one of the movable section and the support portion protrudes toward the other of the movable section and the support portion when viewed in the planar view, and having a predetermined gap between the protrusion portion on one side and the other of the movable section and the support portion; and a second gap portion which is located further toward the base section side than the first gap portion when viewed in the planar view and has a gap wider than the predetermined gap, in which in the first gap portion, the protrusion portion has a ridge portion on the side facing the first gap portion when viewed in a cross-section perpendicular to an extension direction of the support portion.

In this application example, the "ridge portion" is a portion arising due to the crystal structure of a single crystal material such as quartz crystal, for example, which is suitably used as a material for forming the substrate for a sensor, and is a fin-shaped variant portion (an etching residue) which is generated because of etching anisotropy due to a difference in etching rate in the respective crystal axis directions of the quartz crystal when forming the outer shape of the substrate for a sensor by wet-etching the quartz crystal, and is sometimes referred to as a "fin".

According to this application example, the first gap portion having the protrusion portion and also having a predetermined gap is formed between the movable section connected to the base section and the support portion extending along the movable section from the base section, and the second gap portion having a gap wider than the predetermined gap of the first gap portion is formed further toward the base section side than the first gap portion. Due to this configuration, in the first gap portion, the ridge portion is formed at either of the movable section or the support portion, and the inventor has found that it is possible to form a desired shape of the first gap portion in the ridge portion, because etching solution impregnation to the first gap portion becomes good due to the second gap portion having a wider gap than the first gap portion. Because of this, it is possible to accurately form the gap of the first gap portion.

In this way, a structure in which when impact in an in-plane direction of the movable section and the support portion is applied, the movable section which is excessively displaced is restricted by the support portion in the first gap portion in which a predetermined gap is accurately formed can be realized, and thus it becomes possible to prevent breakage of the substrate for a sensor. Therefore, it is possible to provide a substrate for a sensor capable of configuring a physical quantity detection sensor having high impact resistance and high detection accuracy.

Application Example 2

In the substrate for a sensor according to the application example, it is preferable that the support portions are disposed on both sides with the movable section interposed therebetween, when viewed in the planar view, the first gap portions and the second gap portions are provided on both sides with the movable section interposed therebetween, and the respective protrusion portions protrude in the same direction when viewed in the planar view.

According to this application example, in a case where the substrate for a sensor is formed of a single crystal material such as quartz crystal, for example, the ridge portion is formed in a predetermined crystal axis direction, and therefore, the respective protrusion portions are provided to protrude in the same direction, whereby it is possible to substantially uniformly and accurately form the predetermined gaps of the respective first gap portions.

Application Example 3

In the substrate for a sensor according to the application example, the ridge portion may be provided at substantially the center of a cross-section of the protrusion portion.

The inventor has found that according to this application example, the predetermined gap of the first gap portion can be accurately formed.

Application Example 4

In the substrate for a sensor according to the application example, the ridge portion may exhibit a trapezoidal shape in which a width narrows toward the tip portion side from the base end portion side of the movable section or the support portion when viewed in the planar view.

The inventor has found that according to this application example, it is possible to accurately form the predetermined gap of the first gap portion.

Application Example 5

In the substrate for a sensor according to the application example, it is preferable that the substrate for a sensor is formed by using a quartz crystal Z-cut plate cut out in a Z-cut.

According to this application example, the quartz crystal that is a material for forming the substrate for a sensor is formed from a Z-cut quartz crystal substrate (a quartz crystal Z-cut plate) having an X-axis called an electrical axis, a Y-axis called a mechanical axis, and a Z-axis called an optical axis and processed in a flat plate shape by being cut out along a plane which is defined by the X-axis and the Y-axis orthogonal to each other in quartz crystal axes, from raw ore (Lambert) or the like. In the quartz crystal Z-cut plate, etching is relatively easy due to its characteristics, and thus it is possible to precisely form the outer shape of the substrate for a sensor, such as the first gap portion according to the above application example.

Further, a cut-out angle in the thickness direction of the substrate for a sensor and a cut-out angle in the thickness direction of a detection element (a sensor) such as a physical quantity detection element, for example, which is mounted on the substrate for a sensor, are made to be the same Z-cut, whereby it is possible to approximate linear expansion coefficients (coefficients of thermal expansion) to each other. Since a material having approximated linear expansion coefficients is used, the thermal stress between the substrate for a sensor and the detection element due to an ambient temperature change thereof is suppressed, and this can contribute to providing a physical quantity detection sensor capable of performing physical quantity measurement having high detection accuracy with thermal stress suppressed.

Application Example 6

In the substrate for a sensor according to the application example, it is preferable that the protrusion portion protrudes in a +X crystal axis direction of the quartz crystal Z-cut plate.

The inventor has found that according to this application example, the influence of a crystal plane from the Y-axis direction is suppressed, and when viewed in a planar view as viewed from the thickness direction of the substrate for a sensor, the end face of the ridge portion of the protrusion portion is formed to be flat, and the first gap portion can be formed at a desired gap width.

Application Example 7

In the substrate for a sensor according to the application example, a second gap length in a direction intersecting a gap width direction of the second gap portion may be longer than a first gap length in a direction intersecting a gap width direction of the first gap portion.

According to this application example, due to the second gap portion having a gap length longer than the first gap length, when the outer shape of the substrate for a sensor is formed by wet etching, the impregnation of an etching solution from the second gap portion to the first gap portion becomes better, and thus it becomes possible to accurately form the predetermined gap of the first gap portion.

Application Example 8

A physical quantity detection sensor according to this application example includes: the substrate for a sensor according to the application example; and a physical quantity detection element which has one end portion fixed to the base section and the other end portion fixed to the movable section and detects a physical quantity.

According to this application example, the physical quantity detection sensor is provided with the substrate for a sensor according to the above application example and one end portion and the other end portion of the physical quantity detection element are respectively fixed to the base section and the movable section of the substrate for a sensor. Therefore, even in a case where impact is applied, breakage of the physical quantity detection element or the substrate for a sensor is prevented, and thus it is possible to provide a physical quantity detection sensor having high impact resistance and high detection accuracy.

Application Example 9

An acceleration sensor according to this application example includes: the physical quantity detection sensor according to the application example, in which acceleration is measured by the physical quantity detection sensor.

According to this application example, the acceleration sensor is provided with the physical quantity detection sensor according to the above application example, and therefore, impact resistance is high, and the movable section performs exact displacement according to a physical quantity applied thereto, whereby it is possible to accurately detect the physical quantity. In the acceleration sensor equipped with such a physical quantity detection sensor, improvement in the reliability of the measured acceleration can be attained.

Application Example 10

An electronic apparatus according to this application example includes: the physical quantity detection sensor according to the application example.

The electronic apparatus according to this application example is equipped with the physical quantity detection sensor according to the above application example. The physical quantity detection sensor has high impact resistance and can accurately detect a physical quantity applied thereto. In the electronic apparatus equipped with such a physical quantity detection sensor, characteristics of apparatus and improvement in reliability can be attained.

Application Example 11

A moving object according to this application example includes: the physical quantity detection sensor according to the application example.

The moving object according to this application example is equipped with the physical quantity detection sensor according to the above application example, and therefore, impact resistance is high, and it is possible to accurately detect a physical quantity applied thereto. In the moving object equipped with such a physical quantity detection sensor, ascertaining of a movement state, an attitude, or the like can be reliably performed by the detecting function of the physical quantity detection sensor, and thus it is possible to perform safe and stable movement.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. In each of the following drawings, in order to show each layer or each member in a recognizable size, there is a case where each layer or each member is shown on a scale different from the actual size.

Physical Quantity Detection Sensor

Hereinafter, a physical quantity detection sensor according to an embodiment will be described using FIGS. 1 and 3.

Figure 1:
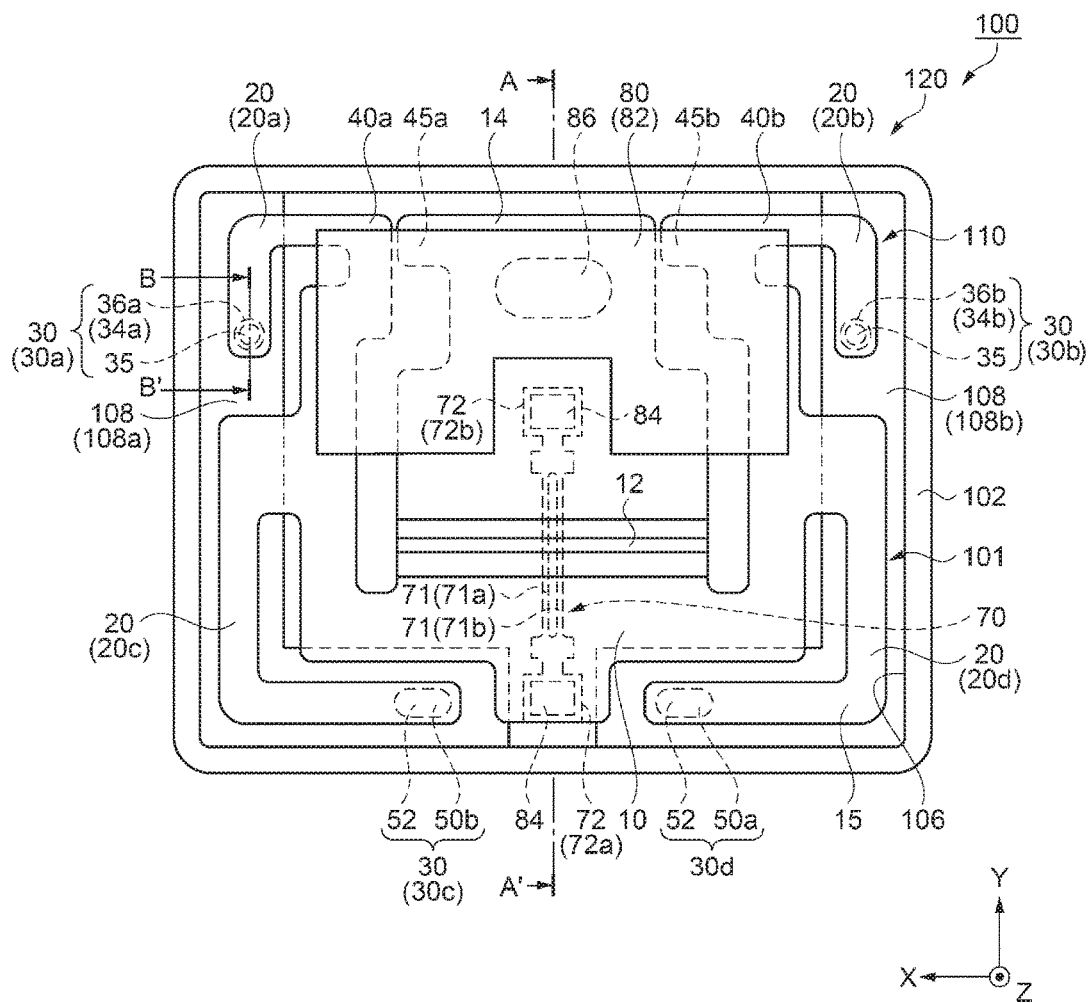
FIG. 1 is a plan view of a physical quantity detection sensor according to an embodiment.

FIG. 1 is a plan view showing the configuration of a physical quantity detection sensor 100 according to this embodiment. FIG. 3 is a cross-sectional view showing the configuration of the physical quantity detection sensor 100 and is a cross-sectional view of a portion indicated by line segment A-A' in FIG. 1. In FIGS. 1 and 3, as three axes orthogonal to each other, an X-axis, a Y-axis, and a Z-axis are shown. The Z-axis is an axis indicating a direction in which the gravity acts.

Further, for convenience of explanation, illustration of a lid 103 is omitted in FIG. 1.

In this embodiment, description will be made with seeing the physical quantity detection sensor 100 from a Z-axis direction regarded as being viewed in a planar view.

Figure 3:
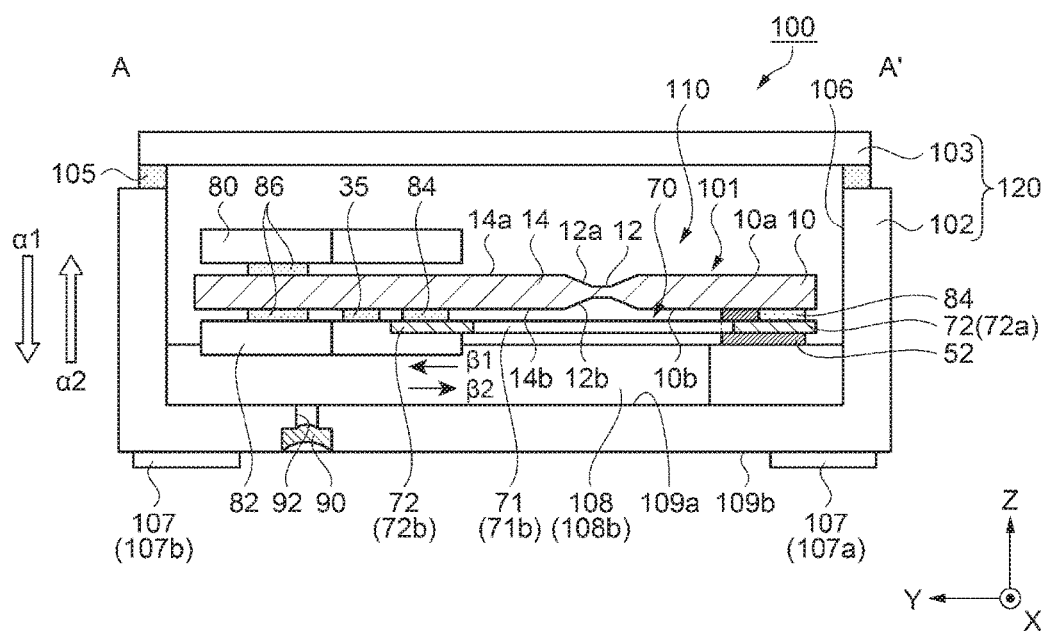
FIG. 3 is a cross-sectional view taken along line segment A-A' of FIG. 1.

The physical quantity detection sensor 100 has a physical quantity detection device 110 and a package 120, as shown in FIGS. 1 and 3. The package 120 has a base substrate 102 and the lid 103.

The base substrate 102 has a recessed portion 106, and the physical quantity detection device 110 is accommodated in the recessed portion 106. The shape of the base substrate 102 is not particularly limited as long as it is possible to accommodate the physical quantity detection device 110 in the recessed portion 106.

In this embodiment, the base substrate 102 is formed of a material having a coefficient of thermal expansion which coincides with or is as close as possible to the coefficient of thermal expansion of a cantilever section 101 as a substrate for a sensor or the lid 103, and in this example, ceramic is used. However, there is no limitation thereto, and a material such as quartz crystal, glass, or silicon may be used.

The base substrate 102 in this embodiment has an inner bottom surface 109a that is a bottom surface on the inside of the recessed portion 106, and step portions 108 (108a and 108b) which protrude toward the lid 103 side from the inner bottom surface 109a.

The step portions 108a and 108b are provided in order to fix the physical quantity detection device 110 (described later) to the base substrate 102 and are each provided, for example, in an approximately L-shape along two directions of the inner wall of the recessed portion 106. Specifically, the step portion 108a is continuously provided to have a predetermined width along the inner wall in a +X-axis direction and the inner wall in a −Y-axis direction of the recessed portion 106 when viewed in a planar view. The step portion 108b is continuously provided to have a predetermined width along the inner wall in a −X-axis direction and the inner wall in the −Y-axis direction of the recessed portion 106 when viewed in a planar view.

Further, when viewed in a planar view, an internal terminal 34a which is included in a first fixing section 30a (described later) is provided on the surface in a +Z-axis direction of the step portion 108a and an internal terminal 34b which is included in a first fixing section 30b (described later) is provided on the surface in the +Z-axis direction of the step portion 108b.

External terminals 107 (107a and 107b) which are used when being mounted on an external member are provided on an outer bottom surface 109b that is the surface on the side opposite to the inner bottom surface 109a of the base substrate 102. The external terminals 107 are electrically connected to the internal terminals 34a and 34b through internal wirings (not shown). For example, the external terminal 107a is electrically connected to the internal terminal 34a and the external terminal 107b is electrically connected to the internal terminal 34b.

Each of the internal terminals 34a and 34b and the external terminals 107a and 107b is configured with, for example, a metal film in formed by coating and laminating a thin film such as nickel (Ni) or gold (Au) on a metallization layer such as tungsten (W) by a method such as plating.

A through-hole 92 penetrating from the outer bottom surface 109b to the inner bottom surface 109a is provided in the base substrate 102, and a sealing section 90 for sealing the inside (the cavity) of the package 120 is provided in the through-hole 92 formed in the base substrate 102. In the example shown in FIG. 3, the through-hole 92 has a stepped shape in which the hole diameter on the outer bottom surface 109b side is larger than the hole diameter on the inner bottom surface 109a side. The sealing section 90 can be provided by disposing a sealing material made of, for example, an alloy of gold (Au) and germanium (Ge), solder, or the like in the through-hole 92, heating and melting the sealing material, and then solidifying it. The sealing section 90 is provided in order to air-tightly seal the inside of the package 120.

The lid 103 is provided so as to cover the recessed portion 106 of the base substrate 102. The shape of the lid 103 is, for example, a plate shape. As the lid 103, the same material as that of the base substrate 102, metal such as kovar or stainless steel, or the like is used. The lid 103 is joined to the base substrate 102 through a lid jointing material 105. As the lid jointing material 105, for example, a sealing ring, low-melting-point glass, an inorganic adhesive, or the like may be used.

The inside of the package 120 is sealed after the joining of the base substrate 102 and the lid 103. The inside of the package 120 is depressurized by removing air in the recessed portion 106 from the through-hole 92 and sealed by a method of closing the through-hole 92 with the sealing section 90 such as a sealing material, and thereby, the physical quantity detection device 110 is mounted in the recessed portion 106 which is in a depressurized and airtight state. The inside of the recessed portion 106 may be filled with an inert gas such as nitrogen, helium, or argon. Further, a configuration is also acceptable in which the lid 103 is formed in a recessed shape and the base substrate 102 may be a flat plate.

Physical Quantity Detection Device

Figure 2:
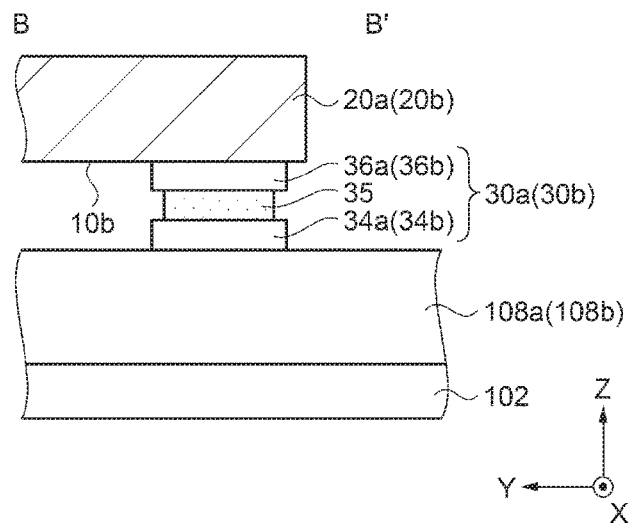
FIG. 2 is a partial cross-sectional view taken along line segment B-B' of FIG. 1.
Figure 4:
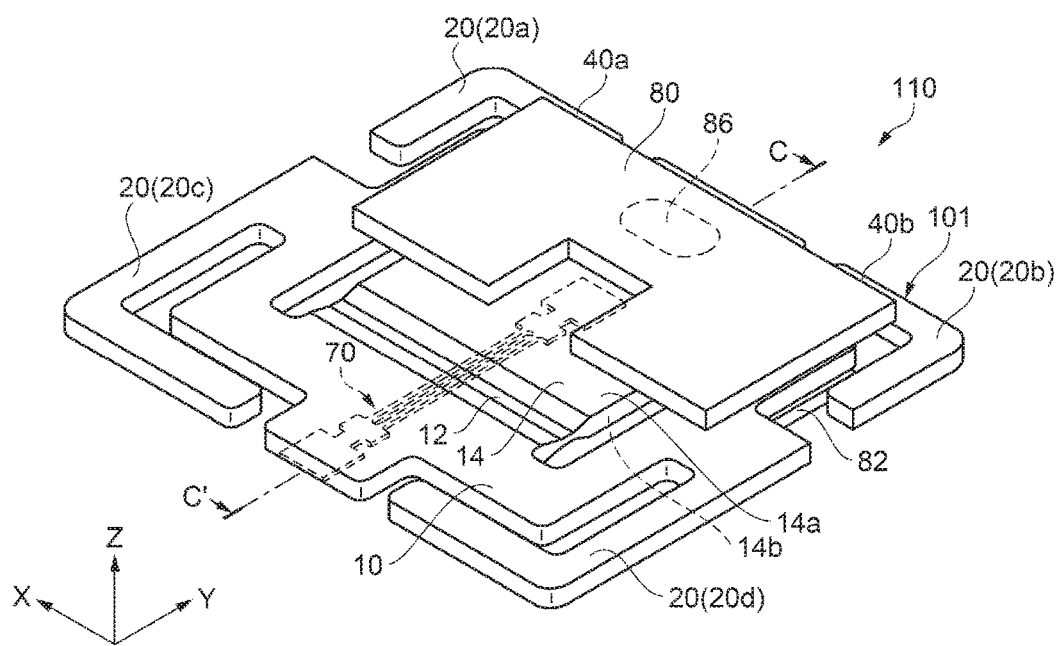
FIG. 4 is a perspective view showing a physical quantity detection device with which the physical quantity detection sensor of FIG. 1 is provided.
Figure 5:
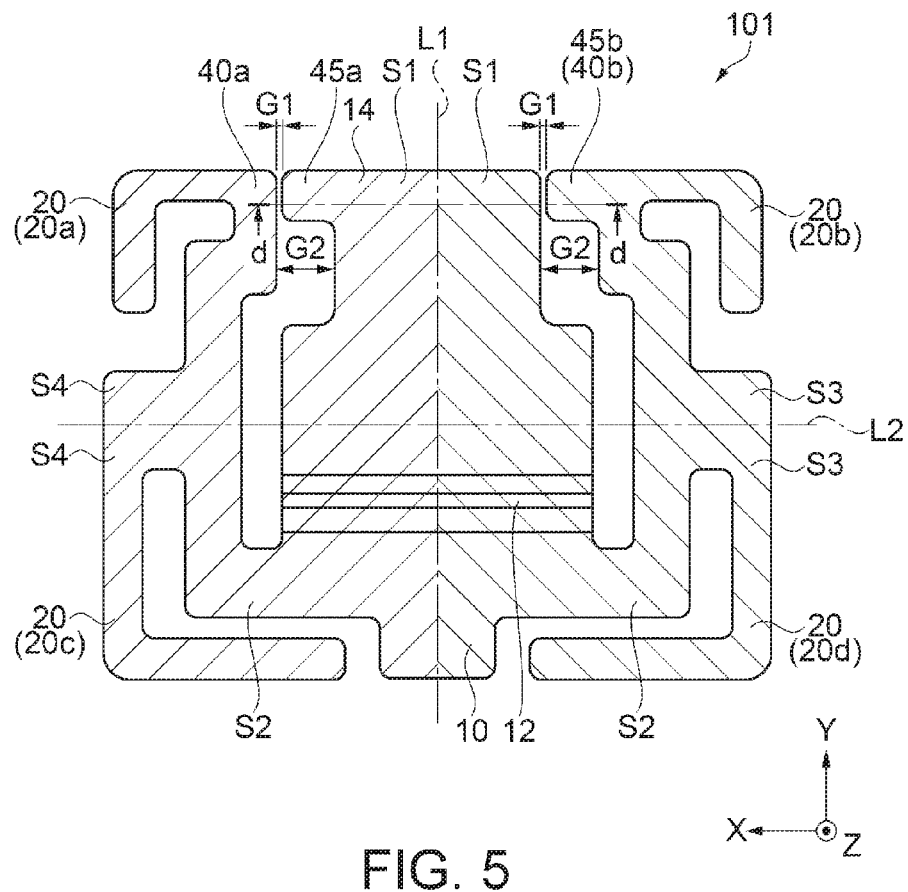
FIG. 5 is a plan view of a cantilever section as a substrate for a sensor with which the physical quantity detection sensor is provided.
Figure 6:
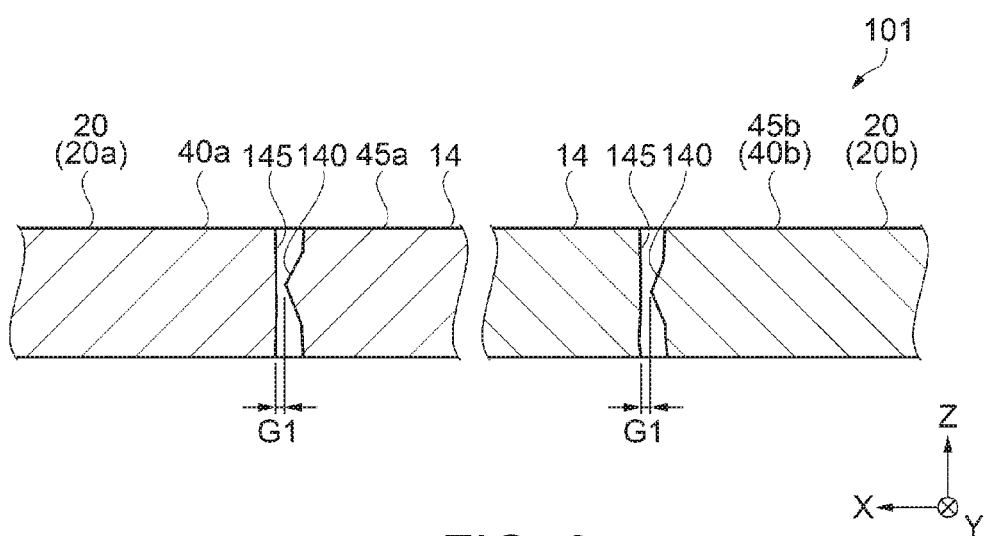
FIG. 6 is a partial cross-sectional view taken along line segment d-d' of FIG. 5.
Figure 7:
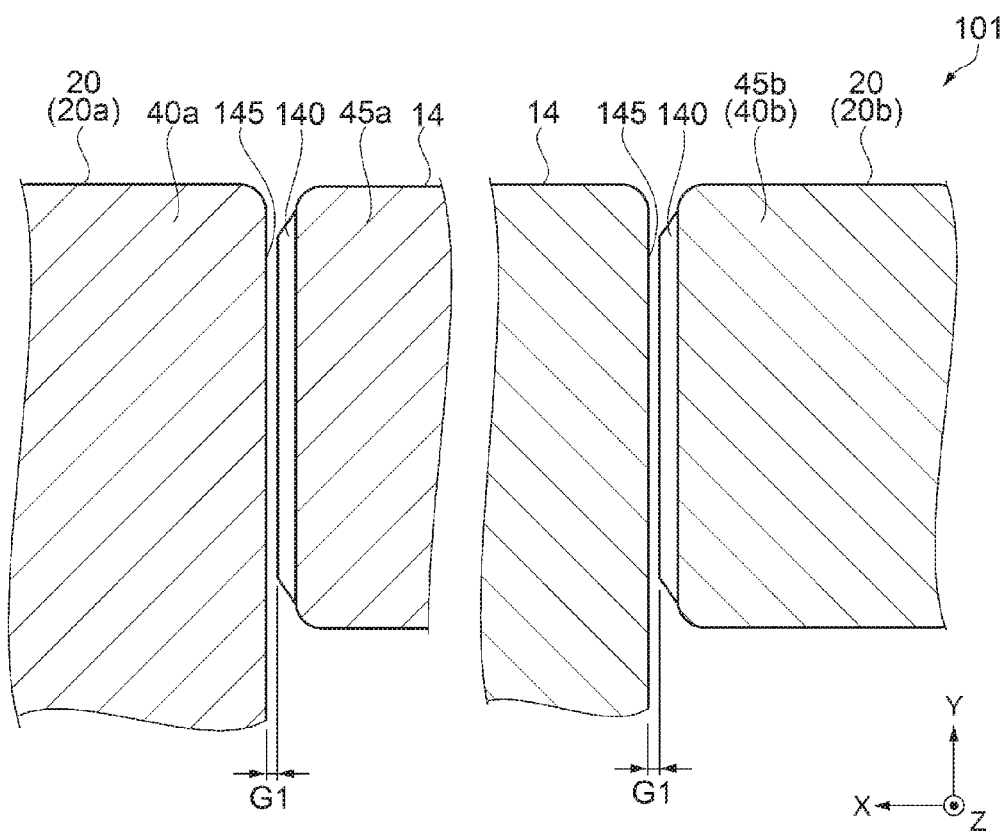
FIG. 7 is a partial plan view showing a first gap portion in FIG. 5 in an enlarged manner.

Next, the physical quantity detection device 110 will be described using FIGS. 1 to 7. FIG. 2 is an enlarged cross-sectional view of a portion shown by line segment B-B' in FIG. 1. FIG. 4 is a perspective view showing the configuration of the physical quantity detection device 110 with which the physical quantity detection sensor 100 of FIG. 1 is provided. FIG. 5 is a plan view showing the cantilever section 101 as the substrate for a sensor with which the physical quantity detection device 110 is provided. FIG. 6 is a partial cross-sectional view taken along line segment d-d' of FIG. 5. Further, FIG. 7 is a partial plan view showing a first gap portion of the cantilever section 101 of FIG. 5 in an enlarged manner.

Further, In FIGS. 2, and 4 to 7, as three axes orthogonal to each other, the X-axis, the Y-axis, and the Z-axis are shown. The Z-axis is an axis indicating a direction in which the gravity acts.

The physical quantity detection device 110 has the cantilever section 101 as the substrate for a sensor fixed to the base substrate 102, a physical quantity detection element 70 which is fixed to the cantilever section 101 and detects a physical quantity, for example, acceleration, and mass sections 80 and 82 which are fixed to the cantilever section 101 and act as weights, as shown in FIGS. 3 and 4.

The physical quantity detection element 70 is disposed on the inner bottom surface 109a side of the cantilever section 101.

First, the cantilever section 101 will be described using FIGS. 1, and 3 to 7.

The cantilever section 101 has a base section 10, a joint section 12, a movable section 14, arm portions 20 (20a, 20b, 20c, and 20d) as support portions, first fixing sections 30 (30a, 30b, 30c, and 30d), and protrusion portions 45a and 45b.

The base section 10 has a plate shape and has a void at a central portion when viewed in a planar view. The movable section 14 likewise having a plate shape is provided in the void, and the movable section 14 and the base section 10 are connected to each other through the joint section 12. The arm portions 20 (20a, 20b, 20c, and 20d) are provided at corner portions of the base section 10. Further, the base section 10 has principal surfaces 10a and 10b (refer to FIG. 3) which are in the relationship of the front and the back opposite to each other. Specifically, the principal surface 10a faces the lid 103 side with respect to the base section 10, and the principal surface 10b faces the inner bottom surface 109a side with respect to the base section 10.

The joint section 12 is provided between the base section 10 and the movable section 14 and is connected to the base section 10 and the movable section 14. The thickness (the length in the Z-axis direction) of the joint section 12 is provided to be thinner (shorter) than the thickness of the base section 10 and the thickness of the movable section 14. For example, in the joint section 12, bottomed groove portions 12a and 12b (refer to FIG. 3) are formed by so-called half-etching treatment from principal surfaces 14a and 14b (described later).

In this embodiment, the groove portions 12a and 12b are provided to extend along an X-axis direction. The joint section 12 becomes a rotary shaft along the X-axis direction as a supporting point (an intermediate hinge) when the movable section 14 is displaced (rotated) with respect to the base section 10.

The movable section 14 is provided to extend from the base section 10. Specifically, the movable section 14 is provided along a Y-axis direction through the joint section 12 from the base section 10. The movable section 14 has a shape that is a plate shape, and has the principal surfaces 14a and 14b (refer to FIG. 3) which are in the relationship of the front and the back opposite to each other. Further, the principal surface 14a faces the lid 103 side with respect to the movable section 14, and the principal surface 14b faces the inner bottom surface 109a side with respect to the movable section 14.

The movable section 14 can be displaced in a direction (the Z-axis direction) intersecting the principal surfaces 14a and 14b with the joint section 12 as a supporting point (a rotary shaft), according to a physical quantity, for example, acceleration α1 or α2 (refer to FIG. 3), which is applied in the direction (the Z-axis direction) intersecting the principal surfaces 14a and 14b.

The mass sections 80 and 82 acting as weights are provided at the movable section 14. Specifically, the mass section 80 is provided on the principal surface 14a through a mass jointing material 86, and the mass section 82 is provided on the principal surface 14b through the mass jointing material 86 so as to overlap the mass section 80 when viewed in a planar view.

As the shape of each of the mass sections 80 and 82, it is preferable to use a shape which is a plate shape and in which a portion of a side on one side in a longitudinal direction when viewed in a planar view has a concave shape recessed toward the side of a facing side, as shown in FIG. 1, for example. The shape of each of the mass sections 80 and 82 is not limited to the above-described shape as long as the movable section 14 can perform predetermined motions.

As a material of each of the mass sections 80 and 82, it is preferable to use, for example, phosphor bronze (Cu—Sn—P). The material of each of the mass sections 80 and 82 is not limited to phosphor bronze. For example, metal such as copper (Cu) or gold (Au) may be used. Further, as a material of the mass jointing material 86, for example, a thermosetting adhesive which includes silicone resin may be used.

In this embodiment, the mass sections 80 and 82 are respectively provided one by one on the principal surfaces 14a and 14b of the movable section 14. However, there is no limitation thereto, and one mass section or a plurality of mass sections 80 and 82 may be provided on either of the principal surface 14a or the principal surface 14b, and a plurality of mass sections 80 and 82 may be provided on each of the principal surfaces 14a and 14b.

Here, the arm portions 20a, 20b, 20c, and 20d of the cantilever section 101 will be described. Each of the arm portions 20a, 20b, 20c, and 20d is provided with a predetermined width in an approximately L-shape when viewed in a planar view.

The arm portion 20a is provided to extend in the +X-axis direction from an end portion in a +Y-axis direction of the base section 10 and then extend along the outer periphery of the base section 10 in the −Y-axis direction when viewed in a planar view. Here, the arm portion 20a as a support portion has a portion provided to extend along the movable section 14 toward the +X-axis direction from the end portion in the +Y-axis direction of the base section 10 when viewed in a planar view as viewed from a thickness direction of the movable section 14.

The arm portion 20a has an installation area for the first fixing section 30a on the principal surface 10b side of the position where the tip of the arm portion 20a and the step portion 108a overlap, when viewed in a planar view. The first fixing section 30a is configured to include a fixing section connection terminal 36a on the principal surface 10b side, a jointing material 35, and the internal terminal 34a of the step portion 108a (refer to FIG. 2). Further, the fixing section connection terminal 36a is connected to the internal terminal 34a through the jointing material 35 so as to overlap the internal terminal 34a when viewed in a planar view.

In this way, the arm portion 20a (the cantilever section 101) is connected to the step portion 108a (the base substrate 102) through the first fixing section 30a.

The arm portion 20b is provided to extend in the —X-axis direction from an end portion in the +Y-axis direction of the base section 10 and then extend along the outer periphery of the base section 10 in the −Y-axis direction when viewed in a planar view. Here, the arm portion 20b as a support portion has a portion provided to extend along the movable section 14 toward the −X-axis direction from the end portion in the +Y-axis direction of the base section 10 when viewed in a planar view as viewed from the thickness direction of the movable section 14.

The arm portion 20b has an installation area for the first fixing section 30b on the principal surface 10b side of the position where the tip of the arm portion 20b and the step portion 108b overlap, when viewed in a planar view. The first fixing section 30b is configured to include a fixing section connection terminal 36b on the principal surface 10b side, the jointing material 35, and the internal terminal 34b of the step portion 108b (the configuration is substantially the same as that of FIG. 2, and therefore, refer to FIG. 2). Further, the fixing section connection terminal 36b is connected to the internal terminal 34b through the jointing material 35 so as to overlap the internal terminal 34b when viewed in a planar view.

In this way, the arm portion 20b (the cantilever section 101) is connected to the step portion 108b (the base substrate 102) through the first fixing section 30b.

As the jointing material 35, for example, a silicone resin-based conductive adhesive or the like, which includes a conductive material such as a metal filler, may be used.

The arm portion 20c is provided to extend the −Y-axis direction from a substantially central portion of an end portion in the +X-axis direction of the base section 10 and then extend along the outer periphery of the base section 10 in the −X-axis direction when viewed in a planar view.

The arm portion 20c has a base joint portion 50b that is an installation area for a base jointing material 52 on the principal surface 10b side of the position where the tip of the arm portion 20c and the step portion 108a overlap, when viewed in a planar view. The first fixing section 30c is configured to include the base jointing material 52 provided at the base joint portion 50b, and the base joint portion 50b.

In this way, the arm portion 20c (the cantilever section 101) is connected to the step portion 108a (the base substrate 102) through the first fixing section 30c.

The arm portion 20d is provided to extend the −Y-axis direction from a substantially central portion of an end portion in the −X-axis direction of the base section 10 and then extend along the outer periphery of the base section 10 in the +X-axis direction when viewed in a planar view.

The arm portion 20d has a base joint portion 50a that is an installation area for the base jointing material 52 on the principal surface 10b side of the position where the tip of the arm portion 20d and the step portion 108b overlap, when viewed in a planar view. The first fixing section 30d is configured to include the base jointing material 52 provided at the base joint portion 50a, and the base joint portion 50a.

In this way, the arm portion 20d (the cantilever section 101) is connected to the step portion 108b (the base substrate 102) through the first fixing section 30d.

As the base jointing material 52, it is preferable to use, for example, bismaleimide resin.

Here, the configurations of the arm portions 20 and the like of the cantilever section 101 will be described using FIG. 5.

In this description, description will be made using a first center line L1 passing through the centers of two base portions 72 of the physical quantity detection element 70 when viewed in a planar view, and a second center line L2 orthogonal to the first center line L1 and passing through the center of the cantilever section 101.

Further, for convenience of explanation, the +Y direction side of the first center line L1 of FIG. 5 is referred to as the "top", the −Y direction side of the first center line L1 is referred to as the "bottom", the +X direction side of the second center line L2 is referred to as the "left", and the −X direction side of the second center line L2 is referred to as the "right".

In the cantilever section 101, an area on the upper side with respect to the second center line L2 is set to be a first area S1, an area on the lower side with respect to the second center line L2 is set to be a second area S2, an area on the right side with respect to the first center line L1 is set to be a third area S3, and an area on the left side with respect to the first center line L1 is set to be a fourth area S4.

The arm portion 20a, the first fixing section 30a, the arm portion 20b, and the first fixing section 30b are provided in the first area S1, and the arm portion 20c, the first fixing section 30c, the arm portion 20d, and the first fixing section 30d are provided in the second area S2.

Further, the arm portion 20b, the first fixing section 30b, the arm portion 20d, and the first fixing section 30d are provided in the third area S3, and the arm portion 20a, the first fixing section 30a, the arm portion 20c, and the first fixing section 30c are provided in the fourth area S4.

Here, each arm portion and each fixing section that each area of the cantilever section 101 has will be described.

First, each fixing section of each area will be described. When the cantilever section 101 shown in FIG. 5 is viewed in a planar view, the first fixing section 30a of the arm portion 20a and the first fixing section 30b of the arm portion 20b, which are present in the first area S1 (the upper side), and the first fixing section 30c of the arm portion 20c and the first fixing section 30d of the arm portion 20d, which are present in the second area S2 (the lower side), are disposed at positions asymmetrical with respect to the second center line L2.

In the physical quantity detection device 110 of this embodiment, for example, in order to detect a physical quantity, for example, acceleration α1 or α2 (refer to FIG. 3) applied to the physical quantity detection device 110, the physical quantity detection element 70 repeats certain vibration (motion). The vibration is propagated to the base section 10 to which the physical quantity detection element 70 is connected, and the arm portion 20a as parasitic oscillation (spurious) and reaches the first fixing section 30a.

Here, the first fixing section 30a is provided on the principal surface 10b side which is connected to the step portion 108a (the base substrate 102). The fixing section connection terminal 36a of the first fixing section 30a is connected to the internal terminal 34a of the step portion 108a through the jointing material 35 so as to overlap the internal terminal 34a when viewed in a planar view. Accordingly, when the step portion 108a and the first fixing section 30a are connected, the first fixing section 30a can selectively connect the principal surface 10b side and the step portion 108a.

Therefore, in a case where spurious (parasitic oscillation) which is generated from the physical quantity detection element 70 is propagated to the arm portion 20a through the base section 10, since the position where the arm portion 20a is fixed to the step portion 108a becomes constant, a resonance frequency of the spurious in the arm portion 20a is kept constant.

The structure of the arm portion 20b is the same as that of the arm portion 20a, and therefore, the detailed description of the arm portion 20b is omitted. Further, the structure of the first fixing section 30b is also the same as that of the first fixing section 30a, and therefore, the detailed description of the first fixing section 30b is omitted.

In the arm portion 20c, in the first fixing section 30c, the principal surface 10b side and the step portion 108a (the base substrate 102) are selectively connected through the base jointing material 52, as described above. Therefore, in a case where the spurious (the parasitic oscillation) which is generated from the physical quantity detection element 70 is propagated to the arm portion 20c through the base section 10, since the position where the arm portion 20c is fixed to the step portion 108a becomes constant, a resonance frequency of the spurious in the arm portion 20c is kept constant.

The structure of the arm portion 20d is the same as that of the arm portion 20c, and therefore, the detailed description of the arm portion 20d is omitted. Further, the structure of the first fixing section 30d is also the same as that of the first fixing section 30c, and therefore, the detailed description of the first fixing section 30d is omitted.

Further, there is a case where stress of strain which is generated due to a difference in coefficient of thermal expansion, or the like between the base section 10 and the base substrate 102 is propagated to the physical quantity detection element 70. In that case, deformation (bending) easily occurs due to the elastic structures of the arm portions 20a, 20b, 20c, and 20d extending from the base section 10, and due to this deformation (bending), it is possible to relax the stress.

Next, the protrusion portions 45a and 45b and restricting portions 40a and 40b will be described using FIGS. 6 and 7 together with FIG. 5. FIGS. 6 and 7 are diagrams showing in detail the protrusion portions 45a and 45b and the restricting portions 40a and 40b, in which FIG. 6 is a partial cross-sectional view taken along line segment d-d' of FIG. 5 and FIG. 7 is a partial plan view showing the first gap portion of FIG. 5 in an enlarged manner.

As shown in FIG. 5, the first gap portion having the protrusion portions 45a and 45b and also having a predetermined gap G1, and a second gap portion which is located further toward the base section 10 side than the first gap portion and has a gap G2 wider than the predetermined gap G1 of the first gap portion are formed between the support portions, that is, the arm portion 20a and the arm portion 20b extending in the +Y direction along the movable section 14 from the base section 10 when viewed in a planar view as viewed from the thickness direction of the cantilever section 101. In this embodiment, on the end portion side opposite to the base section 10 of the cantilever section 101, the movable section 14 has the protrusion portion 45a protruding toward the arm portion 20a side and the protrusion portion 45b protruding toward the movable section 14 side is formed at the arm portion 20b. Further, a side surface portion forming the first gap portion, of each of the protrusion portions 45a and 45b, has a ridge portion 140 that is a fin-shaped variant portion which is formed as an etching residue of quartz crystal.

In the cantilever section 101, the protrusion portions 45a and 45b formed in a plurality are formed to protrude in the same direction (the +X direction). In this way, when forming the outer shape of the cantilever section 101 which includes the first gap portion by wet-etching a quartz crystal substrate (a quartz crystal Z-cut plate), the ridge portion 140 is formed in a predetermined crystal axis direction (a +X crystal axis direction), and therefore, it is possible to substantially uniformly and accurately form the predetermined distances G1 of the respective first gap portions.

Further, the first gap portions each having the predetermined gap G1 are formed between the protrusion portion 45a of the movable section 14 and the arm portion 20a and between the protrusion portion 45b formed to protrude toward the movable section 14 side from the arm portion 20b and the movable section 14, and the second gap portion having the gap G2 wider than the predetermined gap G1 of the first gap portion is formed on the base section side from each of the first gap portions.

The arm portion 20a and the arm portion 20b which are disposed at the base section 10 through the first gap portions each having the predetermined gap G1 with respect to the movable section 14 function as the restricting portions 40a and 40b which restrict the displacement in the X direction of the movable section. That is, the predetermined gap G1 of the first gap portion is a gap set in consideration of an allowable value of the displacement in the X direction of the movable section 14, for preventing breakage due to the displacement in the X direction of the movable section 14 being too large. The action of the restricting portions 40a and 40b will be described later.

In the cantilever section 101, the base section 10, the movable section 14, the joint section 12, and the arm portions 20 (20a, 20b, 20c, and 20d) are formed by performing treatment such as wet etching on, for example, a quartz crystal substrate. As a material, a plate-shaped quartz crystal substrate (also referred to as a "quartz crystal Z-cut plate (hereinafter referred to as a "Z-cut plate")") which is located along an X-Y plane is used.

The quartz crystal substrate described above is subjected to wet etching treatment, whereby the base section 10, the movable section 14, the arm portions 20 (20a, 20b, 20c, and 20d), and the like are integrally formed. If the quartz crystal substrate is subjected to the wet etching treatment, etching progresses along the Z-axis. Quartz crystal has an etching anisotropy specific to quartz crystal, in which an etching rate changes according to the direction of each crystal axis, and therefore, the ridge portion 140 that is a fin-shaped variant portion which is an etching residue is generated in a void of the quartz crystal substrate after the quartz crystal substrate is subjected to the wet etching treatment (refer to FIGS. 6 and 7). The ridge portion 140 is generated toward the +X-axis direction from an intersection portion of the direction of the −X-axis and the direction of the ±Y axis in a case where the quartz crystal substrate is a Z-cut plate. In the invention, the ridge portion 140 is used in order to accurately form the gap width (G1) of the first gap portion having the predetermined gap G1. Hereinafter, this will be described.

As shown in FIGS. 6 and 7, the ridge portions 140 are formed to protrude in the same direction in the first gap portions each having the predetermined gap G1. In this embodiment, when viewed in a planar view as viewed from the thickness direction of the movable section 14 (the cantilever section 101), the ridge portions 140 are formed at the protrusion portions 45a and 45b protruding in the same direction, that is, a side wall portion of the protrusion portion 45a protruding toward the arm portion 20a side from the movable section 14, and a side wall portion of the protrusion portion 45b protruding toward the movable section 14 side from the arm portion 20b. In this embodiment, in a gap (the first gap portion) of the quartz crystal substrate, the ridge portion 140 is formed so as to protrude in the +X crystal axis direction of the quartz crystal Z-cut plate.

As shown in FIG. 6, in the first gap portion having a predetermined gap width (G1) of the cantilever section 101, the ridge portion 140 is formed at approximately the center of the cross-section of each of the movable section 14 and the arm portion 20b. Further, the cross-section of the ridge portion 140 exhibits a shape in which a width is an apex portion (an edge) is formed at the tip.

Further, as shown in FIG. 7, each ridge portion 140 of the first gap portions exhibits a trapezoidal shape in which the width is narrowed toward the tip portion side from the base end portion side of each of the protrusion portion 45a of the movable section 14 and the protrusion portion 45b of the arm portion 20b when viewed in a planar view as viewed from the thickness direction of the movable section 14 (the cantilever section 101).

Further, as described above, as a factor in which the gap width (G1) of the first gap portion which includes the ridge portion 140 can be accurately formed, action to improve etching uniformity by the second gap portion having the gap G2 shown in FIG. 5 can be given. That is, in the cantilever section 101 shown in FIG. 5, along with the first gap portion having the predetermined gap G1 described above, the second gap portion having the gap G2 wider than the predetermined gap G1 of the first gap portion is formed further toward the base section 10 side than the first gap portion.

In this way, the ridge portions 140 (not shown) are formed at the movable section 14 and the arm portion 20b in the first gap portions, and in the ridge portions 140 (not shown), it is possible to forma desired shape, because etching solution impregnation to the first gap portion becomes good due to the second gap portion having the gap G2 wider than the gap width (G1) of the first gap portion, at the time of the formation of the outer shape of the cantilever section 101 by wet etching of the quartz crystal substrate.

Further, in this embodiment, a second gap length that is a length in a direction intersecting the direction of the gap width G2 of the second gap portion is formed to be longer than a first gap length that is a length in a direction intersecting the direction of the gap width G1 of the first gap portion. In this way, when the outer shape of the cantilever section 101 is formed by wet etching, the impregnation of an etching solution from the second gap portion to the first gap portion becomes better, and thus it becomes possible to accurately form the predetermined gap G1 of the first gap portion.

Due to the configuration of this embodiment described above, it is possible to accurately adjust and form the gap G1 of the first gap portion.

The inventor has found that, for example, in a case where the thickness of the quartz crystal substrate is in a range of 400 μm to 500 μm, the predetermined gap G1 of the first gap portion is formed in a range of 5 μm to 15 μm, whereby higher impact resistance of the physical quantity detection sensor 100 is secured.

Physical Quantity Detection Element

As shown FIGS. 1, 3, and 4, the physical quantity detection element 70 has the two base portions 72 (72a and 72b) and vibration beam portions 71 (71a and 71b) provided between the base portions 72a and 72b, and the two base portions 72 are respectively connected to the base section 10 (the principal surface 10b) and the movable section 14 (the principal surface 14b), thereby being provided across the joint section 12.

In the physical quantity detection element 70 of this embodiment, for example, the movable section 14 is displaced according to a physical quantity, whereby stress occurs in the vibration beam portions 71a and 71b, and thus physical quantity detection information occurring in the vibration beam portions 71a and 71b changes. In other words, the vibration frequencies (the resonance frequencies) of the vibration beam portions 71a and 71b change. In this embodiment, the physical quantity detection element 70 is a double-ended tuning fork element (a double-ended tuning fork type vibration element) having the two vibration beam portions 71a and 71b and a pair of base portions 72a and 72b.

The vibration beam portions 71a and 71b are provided to extend between the base portion 72a and the base portion 72b along the Y-axis direction in which the movable section 14 extends. The shape of each of the vibration beam portions 71a and 71b is, for example, a rectangular column shape. The vibration beam portions 71a and 71b perform bending vibration so as to be separated from each other or come close to each other along the X-axis direction if a drive signal is applied to excitation electrodes (not shown) provided at the vibration beam portions 71a and 71b.

The base portions 72a and 72b are connected to both ends in an extension direction of the vibration beam portions 71a and 71b. The base portion 72a as an end portion on one side of the physical quantity detection element 70 is connected to the principal surface 10b of the base section 10 through a detection element jointing material 84. Further, the base portion 72b as an end portion on the other side of the physical quantity detection element 70 is connected to the principal surface 14b of the movable section 14 through the detection element jointing material 84. As the detection element jointing material 84, for example, low-melting-point glass or an alloy coating of gold (Au) and tin (Sn), in which eutectic bonding is possible, may be used.

The physical quantity detection element 70 in this embodiment is formed, for example, by patterning a quartz crystal substrate cut-out at a predetermined angle from so-called quartz crystal raw ore or the like, by a photolithography technique and an etching technique. In this way, it is possible to integrally form the vibration beam portions 71a and 71b and the base portions 72a and 72b.

A material of the physical quantity detection element 70 is not limited to the quartz crystal substrate described above. For example, a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO), or aluminum nitride (AlN) may be used. Further, a semiconductor material such as silicon provided with a piezoelectric body (piezoelectric material) coating such as zinc oxide (ZnO) or aluminum nitride (AlN) may be used.

For example, an extraction electrode (not shown) is provided on the base portion 72a of the physical quantity detection element 70. The extraction electrode is electrically connected to the excitation electrodes (not shown) provided at the vibration beam portions 71a and 71b.

The extraction electrode is electrically connected to a connection terminal (not shown) provided on the principal surface 10b of the base section 10, by a metal wire (not shown) such as gold (Au) or aluminum (Al), for example.

The connection terminal is electrically connected to the fixing section connection terminals 36a and 36b by a wiring (not shown).

As each of the excitation electrodes, the extraction electrode, the connection terminal, and the fixing section connection terminals 36a and 36b, a laminated body in which, for example, a chromium (Cr) layer is provided as a foundation and a gold (Au) layer is laminated thereon is used. The excitation electrodes, the extraction electrode, the connection terminal, and the fixing section connection terminals 36a and 36b are provided by forming a conductive layer by, for example, sputtering method or the like and patterning the conductive layer.

In the physical quantity detection element 70 in this embodiment, the vibration beam portions 71a and 71b provided between the two base portions 72a and 72b are disposed to intersect (be orthogonal to) the joint section 12. In other words, the vibration beam portions 71a and 71b are disposed along a direction intersecting a direction in which the groove portions 12a and 12b extend. In this way, it becomes possible to directly transmit the bending of the movable section 14 when, for example, acceleration is applied thereto, to the vibration beam portions 71a and 71b. Therefore, slight bending of the movable section 14 can also be detected as a change in the resonance frequency in the vibration beam portions 71a and 71b, and thus it becomes possible to prevent a decrease in detection sensitivity.

The physical quantity detection element 70 is provided on the principal surface 10b on the inner bottom surface 109a side with respect to the base section 10, and the principal surface 14b. However, a configuration in which the physical quantity detection element 70 is provided on the principal surface 10a on the lid 103 side with respect to the base section 10, and the principal surface 14a, is also conceivable.

Here, the effects of the restricting portions 40a and 40b of the cantilever section 101 as the substrate for a sensor in the physical quantity detection sensor 100 (the physical quantity detection device 110) having the configuration described above will be described.

The restricting portions 40a and 40b (refer to FIGS. 1, 4, and 5 to 7) come into contact with the movable section 14 displaced in the X-axis direction, in a case where impact larger than a predetermined magnitude is applied in the X-axis direction of the physical quantity detection sensor 100, in FIG. 1, for example. For this reason, the displacement of the movable section 14 in X-axis direction is restricted within a predetermined range by the restricting portions 40a and 40b. In this way, breakage of the physical quantity detection device 110 (the cantilever section 101), which occurs due to the excessive displacement in the X-axis direction of the movable section 14, is prevented.

Operation of Physical Quantity Detection Device

Next, an operation of the physical quantity detection device 110 will be described using FIG. 3.

In FIG. 3, as three axes orthogonal to each other, the X-axis, the Y-axis, and the Z-axis are shown. The Z-axis is an axis indicating a direction in which the gravity acts.

In FIG. 3, for example, if the acceleration α1 (acceleration which is applied in the direction of the gravitational force) as a physical quantity is applied in a −Z-axis direction to the physical quantity detection device 110, the movable section 14 is displaced in the −Z-axis direction with the joint section 12 as a supporting point, according to the acceleration α1. In this way, in the physical quantity detection element 70, a force (tension) in a direction of an arrow β1 (a direction away from each other) is applied to the base portion 72a and the base portion 72b along the Y-axis, and thus tensile stress in the direction of the arrow β1 occurs in the vibration beam portions 71a and 71b. For this reason, the vibration frequencies (the resonance frequencies) of the vibration beam portions 71a and 71b becomes higher.

On the other hand, for example, if the acceleration α2 (acceleration which is applied in a direction opposite to the direction of the gravitational force) is applied in a +Z-axis direction to the physical quantity detection device 110, the movable section 14 is displaced in the +Z-axis direction with the joint section 12 as a supporting point, according to the acceleration α2. In this way, in the physical quantity detection element 70, a force (a compressive force) in a direction of an arrow β2 (a direction approaching each other) is applied to the base portion 72a and the base portion 72b along the Y-axis, and thus compressive stress in the direction of the arrow 132 occurs in the vibration beam portions 71a and 71b. For this reason, the vibration frequencies (the resonance frequencies) of the vibration beam portions 71a and 71b become lower.

The physical quantity detection sensor 100 may be equipped with an electronic circuit for processing an output signal which is output from the physical quantity detection device 110. For example, in the physical quantity detection sensor 100 shown in FIG. 3, it is possible to make a configuration in which the electronic circuit is provided within the recessed portion 106 of the base substrate 102.

In the physical quantity detection sensor 100 as described above, a drive signal is applied from the electronic circuit to the excitation electrode (not shown) of the physical quantity detection device 110 via the internal terminals 34a and 34b (not shown). If the drive signal is applied, the vibration beam portions 71a and 71b of the physical quantity detection element 70 perform bending vibration (resonance) at a predetermined frequency. Then, in the physical quantity detection sensor 100, the physical quantity detection element 70 changes according to the acceleration α1 or α2 which is applied thereto. A resonance frequency which is output from the physical quantity detection element 70 due to the change thereof is amplified in the electronic circuit and is output from the external terminals 107a and 107b to the outside of the physical quantity detection sensor 100 by wiring (not shown).

The physical quantity detection sensor 100 may be used as an inclination sensor, in addition to being used as an acceleration sensor in which the detection of the above-described acceleration is possible. In the physical quantity detection sensor 100 as an inclination sensor, if a direction in which gravitational acceleration is applied to the physical quantity detection sensor 100 changes according to a change in attitude due to inclination, the movable section 14 is bent due to the weight of the mass sections 80 and 82, and thus tensile stress or compressive stress occurs in the vibration beam portions 71a and 71b of the physical quantity detection element 70. Then, the resonance frequencies of the vibration beam portions 71a and 71b change. The state of an attitude due to inclination is derived based on the change.

As described above, according to the physical quantity detection sensor 100 according to this embodiment, the following effects are obtained.

According to the above-described embodiment, the cantilever section 101 as the substrate for a sensor of the physical quantity detection sensor 100 has the protrusion portions 45a and 45b between the movable section 14 and the arm portion 20 as a support portion, has the first gap portion having the predetermined gap G1 and the second gap portion which is located further toward the base section 10 side than the first gap portion and has the gap G2 wider than the predetermined gap G1 of the first gap portion, and has the ridge portion 140 formed as an etching residue at either of the movable section 14 or the arm portion 20 in the first gap portion.

According to this configuration, when forming the outer shape of the cantilever section 101 by wet-etching a quartz crystal substrate, in the ridge portion 140 formed at either of the movable section 14 or the arm portion 20 in the first gap portion, it is possible to accurately form a desired shape, because etching solution impregnation to the first gap portion becomes good due to the second gap portion having the gap G2 wider than the gap G1 of the first gap portion.

In this way, it is possible to provide the first gap portion in which the predetermined gap G1, which performs restriction such that the displacement of the movable section does not become excessive when impact in an in-plane direction (the X direction) of the movable section 14 and the arm portions 20 (20a and 20b) is applied, is accurately formed, and therefore, a structure in which the displacement of the movable section 14 is restricted by the restricting portions 40a and 40b of the arm portions 20 (20a and 20b) can be realized.

Therefore, it is possible to provide the physical quantity detection sensor 100 having high impact resistance, in which when impact is applied, breakage of the cantilever section 101 or the physical quantity detection element 70 can be prevented.

Further, the gap length (G1) of the first gap portion is also prevented from becoming smaller than a design value, and therefore, trouble in which the set detection range of a physical quantity such as acceleration is not satisfied due to the displacement range of the movable section 14 being restricted to be smaller than the setting can be avoided.

Therefore, it becomes possible to provide the physical quantity detection sensor 100 having high detection accuracy.

Further, in the above-described embodiment, a configuration is made in which each of the first gap portion and the second gap portion is formed in a plurality (by two) and a plurality of (two) protrusion portions 45a and 45b protrude in the same direction.

In this way, when forming the outer shape of the cantilever section 101 by wet-etching a quartz crystal substrate, the ridge portion 140 is formed in a predetermined crystal axis direction (the +X crystal axis direction), and therefore, the respective protrusion portions 45a and 45b are provided to protrude in the same direction, whereby it is possible to substantially uniformly and accurately form the predetermined gap G1 of each of the first gap portions.

Further, in the cantilever section 101 of the above-described embodiment, a configuration is made in which the ridge portion 140 is formed at substantially the center of the cross-section of either of the movable section 14 and the arm portion 20 (20a or 20b) as a support portion in the first gap portion. Further, a configuration is made in which the cross-sectional shape of the ridge portion 140 exhibits a shape in which a width is narrowed toward the tip from the base end side and an apex portion (an edge) is formed at the tip side.

Further, a configuration is made in which the ridge portion 140 exhibits a trapezoidal shape in which a width is narrowed toward the tip portion side from the base end portion side when viewed in a planar view as viewed from the thickness direction of the movable section 14 (the cantilever section 101).

The inventor has found that the first gap portion in which the ridge portion 140 having the above-described shape is formed can be accurately formed so as to have an appropriate gap G1 which performs restriction such that the displacement in the X direction of the movable section 14 does not become excessive.

Further, the cantilever section 101 as the substrate for a sensor of the above-described embodiment is formed using a quartz crystal Z-cut plate cut out in a Z-cut. Further, the protrusion portions 45a and 45b in the first gap portion are disposed so as to protrude in the +X crystal axis direction of the quartz crystal Z-cut plate.

In this way, the inventor has found that the influence of a crystal plane from the Y-axis direction is suppressed, and when viewed in a planar view as viewed from the thickness direction of the cantilever section 101, the end face of the ridge portion 140 which is formed at each of the protrusion portions 45a and 45b is formed to be flat, and the first gap portion can be accurately formed at a desired gap width G1.

Further, in the quartz crystal Z-cut plate, etching is relatively easy due to its characteristics, and thus it is possible to more precisely form the outer shape such as the first gap portion of the cantilever section 101.

Further, a cut-out angle in the thickness direction of the cantilever section 101 and a cut-out angle in the thickness direction of the physical quantity detection element 70 are made to be the same Z-cut, whereby it is possible to approximate linear expansion coefficients (coefficients of thermal expansion) to each other. Therefore, the thermal stress between the cantilever section 101 and the physical quantity detection element 70 due to an ambient temperature change thereof is suppressed, and this can contribute to providing the physical quantity detection sensor 100 in which it is possible to perform physical quantity measurement having high detection accuracy with thermal stress suppressed.

Further, it is possible to provide the physical quantity detection sensor 100 in which in a case where stress of strain which is generated due to a difference in coefficient of thermal expansion, or the like between the base section 10 and the base substrate 102 is propagated to the physical quantity detection element 70, deformation (bending) easily occurs due to the elastic structures of the arm portions 20a, 20b, 20c, and 20d extending from the base section 10, and due to this deformation (bending), it is possible to relax the stress.

Therefore, even in a case where spurious which is generated from the physical quantity detection element 70 is propagated to the first fixing sections 30 (30a, 30b, 30c, and 30d) through the base section 10, the area and the position which are fixed become constant, and therefore, the resonance frequency of the spurious is kept constant.

Further, the physical quantity detection element 70 in the physical quantity detection sensor 100 of this embodiment is connected (fixed) to the base section 10 and the movable section 14. In this way, both ends (the base portions 72a and 72b) of the physical quantity detection element 70 are fixed, and therefore, vibration other than the vibration of the physical quantity detection element 70 is prevented from being detected as noise. Further, the influence of the strain of the detection element jointing material 84 and a strain due to a difference in coefficient of thermal expansion between the cantilever section 101 and the base substrate 102 is suppressed, and thus it is possible to provide the physical quantity detection sensor 100 in which it is possible to prevent breakage of the physical quantity detection element 70.

Further, the physical quantity detection sensor 100 is a sensor having high detection accuracy, in which the movable section 14 is displaced according to a physical quantity applied thereto and the physical quantity detection element 70 can detect the displacement.

Further, according to the physical quantity detection sensor 100 in which the physical quantity detection device 110 is accommodated in the package 120, it is possible to detect a physical quantity with the influence due to a disturbance factor such as an atmosphere or a temperature outside of the package 120 suppressed, and thus it is possible to maintain stable detection performance as a detection sensor.

The invention is not limited to the embodiment described above, and it is possible to add various changes, improvements, or the like to the embodiment described above. A modification example will be described below.

Modification Example

Figure 8:
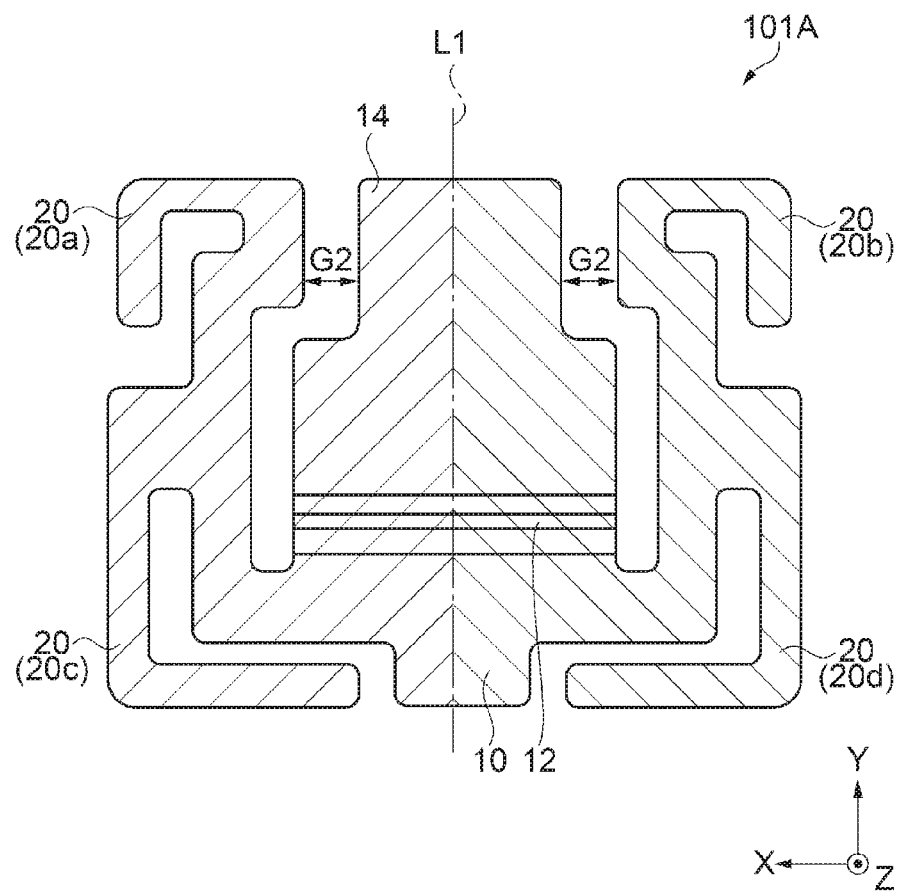
FIG. 8 is a plan view of a cantilever section according to a modification example of the physical quantity detection device.
Figure 9:
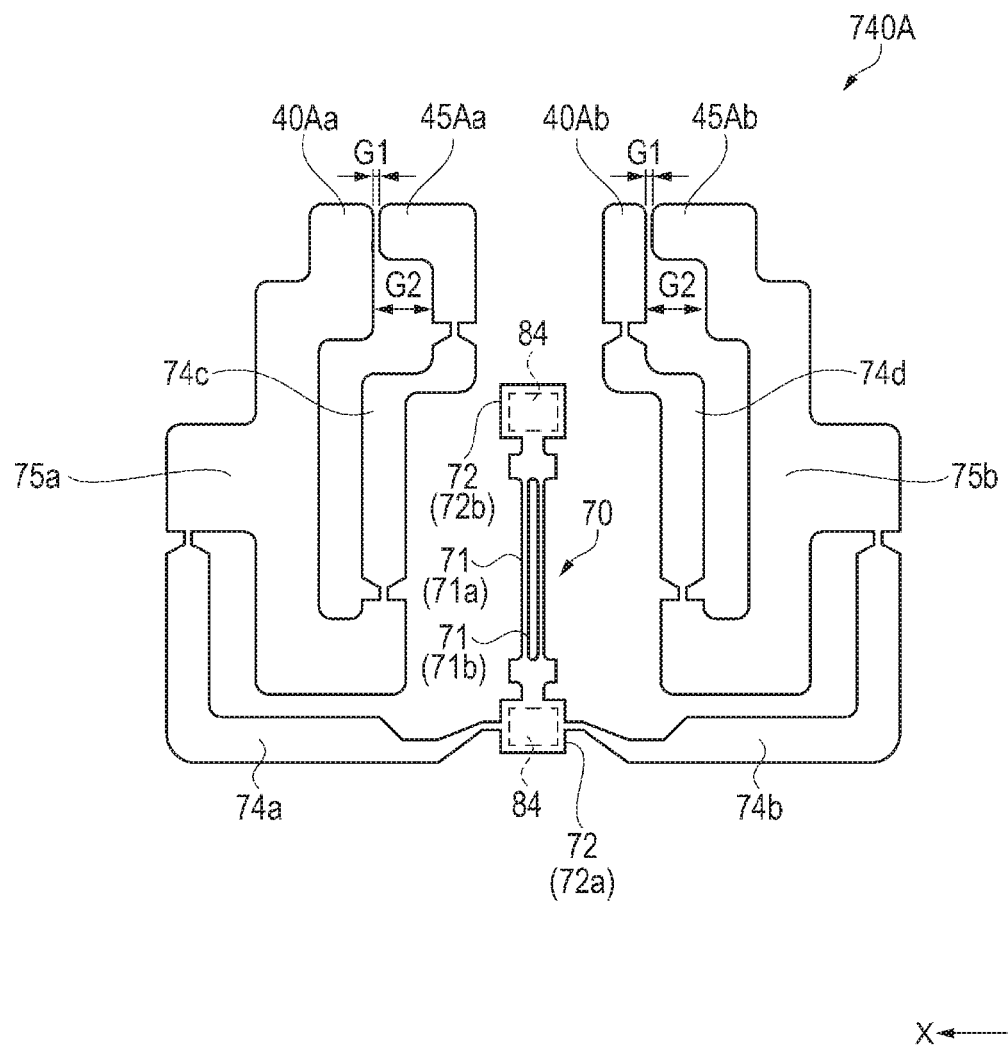
FIG. 9 is a plan view showing an element piece according to the modification example.
Figure 10A:
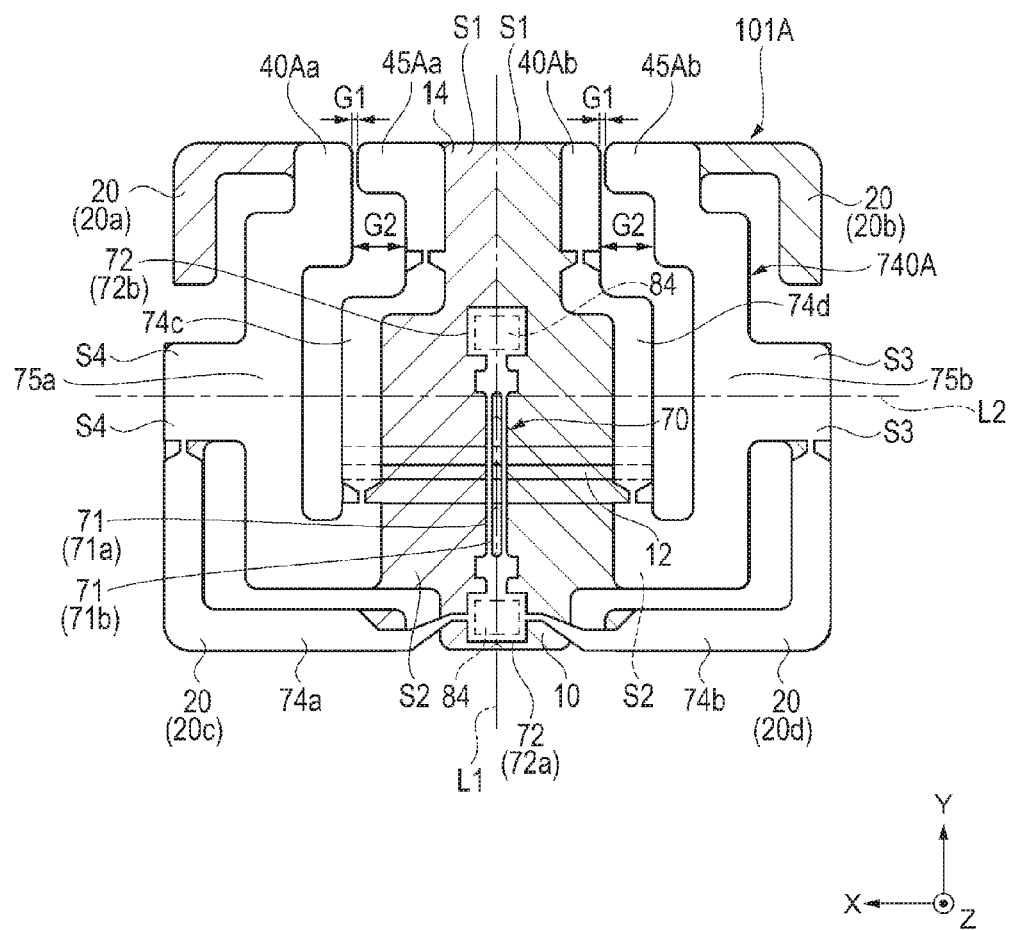
FIG. 10A is a plan view showing a state where the element piece is joined to the cantilever section according to the modification example.
Figure 10B:
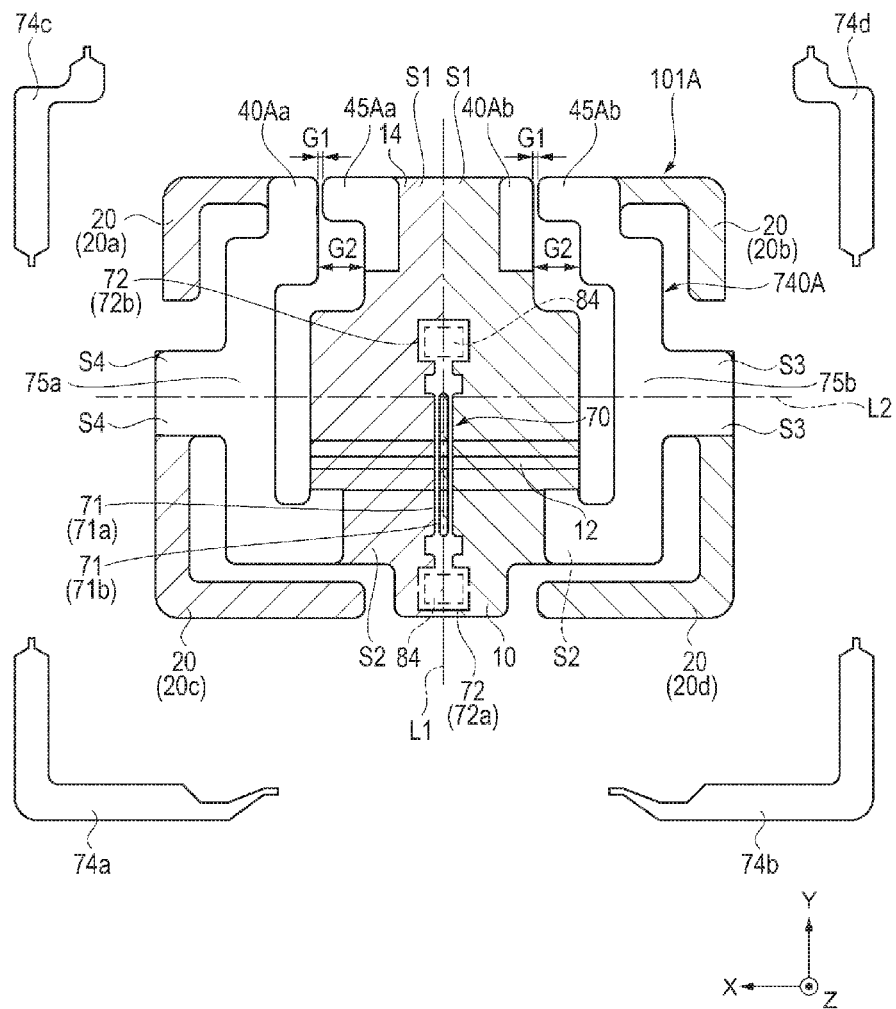
FIG. 10B is a plan view showing a state where connection portions of the element piece on the cantilever section are removed.

FIG. 8 is a plan view of a cantilever section according to a modification example of the physical quantity detection device. FIG. 9 is a plan view showing an element piece according to the modification example. Further, FIG. 10A is a plan view showing a state where the element piece is joined to the cantilever section according to the modification example, and FIG. 10B is a plan view showing a state where connection portions of the element piece on the cantilever section are removed.

In the above-described embodiment, as in FIG. 5, the configuration in which the restricting portions 40a and 40b which restrict the displacement in the X direction of the movable section 14 of the cantilever section 101 are formed in the cantilever section 101 itself has been described. However, there is no limitation to this configuration.

Hereinafter, the configuration of a physical quantity detection sensor according to the modification example will be described. The same constituent sites as those of the above-described embodiment are denoted by the same reference numerals and overlapping description is omitted.

As shown in FIG. 8, a cantilever section 101A according to this modification example is formed in a shape in which the protrusion portions 45a and 45b (refer to FIG. 5) for configuring the restricting portions 40a and 40b are removed in the cantilever section 101 of the above-described embodiment. That is, a gap wider than the predetermined gap G1 of the first gap portion of the above-described embodiment is formed between the movable section 14 and each of the arm portions 20 (20a and 20b) disposed on both sides of the movable section 14. In this modification example, the gap G2 of the second gap portion described above is formed between the movable section 14 and each of the arm portions 20 (20a and 20b).

In an element piece 740A shown in FIG. 9, treatment such as the same wet etching as that in the method of forming the cantilever section 110 of the above-described embodiment is performed on a quartz crystal Z-cut plate, whereby the physical quantity detection element 70 having the same configuration as that in the above-described embodiment, two protrusion portions 45Aa and 45Ab, restricting portions 40Aa and 40Ab respectively corresponding to the protrusion portions 45Aa and 45Ab, reinforcing portions 75a and 75b, and connection portions 74a to 74d are formed integrally.

Two sets of protrusion portions 45Aa and 45Ab and restricting portions 40Aa and 40Ab in the element piece 740A are formed in the same shape and positional relationship as two sets of protrusion portions 45a and 45b and restricting portions 40a and 40b (refer to FIG. 5) in the cantilever section 101 of the above-described embodiment. In this way, the first gap portions each having the predetermined gap G1 are formed between the protrusion portion 45Aa and the restricting portion 40Aa and between the protrusion portion 45Ab and the restricting portion 40Ab. Further, the second gap portions each having the gap G2 wider than the predetermined gap G1 of the first gap portion are formed at positions corresponding to the second gap portions of the cantilever section 101 of the above-described embodiment. In this way, the predetermined gaps G1 of the first gap portions can be accurately formed due to the action at the time of the same wet etching treatment as that in the above-described embodiment.

Further, each of the reinforcing portions 75a and 75b of the element piece 740A is formed in the same shape and positional relationship as a portion of each of the arm portions 20 as support portions extending along the movable section 14 from the base section 10 in the cantilever section 101 of the above-described embodiment and the cantilever section 101A of this modification example, and a portion is connected to the restricting portion 40Aa or the protrusion portion 45Ab. In this modification example, in the reinforcing portion 75a, a portion is connected to the restricting portion 40Aa and a portion is formed in the same shape as a portion of each of the arm portions 20a and 20c of the cantilever sections 101 and 101A, and in the reinforcing portion 75b, a portion is connected to the protrusion portion 45Ab and a portion is formed in the same shape as a portion of each of the arm portions 20b and 20d of the cantilever sections 101 and 101A. The reinforcing portions 75a and 75b are sites for reinforcing a support structure by the arm portions 20 of the cantilever section 101A when a portion of the element piece 740A and the cantilever section 101A are joined to each other, as will be described later, and are not limited to the shape of FIG. 9. The shape can be changed according to a position where reinforcement is required, and if reinforcement is not required, a configuration in which there are no reinforcing portions 75a and 75b in the element piece 740A is also acceptable.

Further, the connection portions 74a to 74d are sites for integrally connecting the respective sites of the physical quantity detection element 70, the protrusion portions 45Aa and 45Ab, the restricting portions 40Aa and 40Ab, and the reinforcing portions 75a and 75b in the element piece 740A. In this modification example, the connection portion 74a connects the physical quantity detection element 70 and the reinforcing portion 75a extending from the restricting portion 40Aa, the connection portion 74b connects the physical quantity detection element 70 and the reinforcing portion 75b extending from the protrusion portion 45Ab, the connection portion 74c connects the protrusion portion 45Aa and the reinforcing portion 75a, and the connection portion 74d connects the restricting portion 40Ab and the reinforcing portion 75b. These connection portions 74a to 74d are sites which are removed after the element piece 740A is joined to the cantilever section 101A, as will be described later.

FIG. 10A shows a state where the element piece 740A described above is joined to the cantilever section 101A. In the element piece 740A, the physical quantity detection element 70 is connected, at the base portion 72a, to the base section 10 through the detection element jointing material 84 and connected, at the base portion 72b, to the movable section 14 through the detection element jointing material 84, similar to the above-described embodiment. Further, in the element piece 740A, except for the connection portions 74a to 74d, the protrusion portions 45Aa and 45Ab, the restricting portions 40Aa and 40Ab, and the reinforcing portions 75a and 75b are joined to corresponding positions of the cantilever section 101A through joining members such as an adhesive. In this way, the physical quantity detection element 70 is joined to the cantilever section 101A, and the restricting portions 40Aa and 40Ab for restricting the displacement in the X direction of the cantilever section 101A can be formed in a state where the first gap portions each having the predetermined gap G1 are accurately secured.

In this manner, after a portion of the element piece 740A is joined to the cantilever section 101A, the connection portions 74a to 74d which has become unnecessary are removed, as shown in FIG. 10B.

As described above, according to the physical quantity detection device according to this modification example, it is possible to obtain the following effects, in addition to the effects in the above-described embodiment.

In this modification example, in a process of forming the physical quantity detection element 70 by the quartz crystal Z-plate, the element piece 740A in which the protrusion portions 45Aa and 45Ab having the first gap portions each having the predetermined gap G1 and the restricting portions 40Aa and 40Ab are integrally formed by the action of the wet etching treatment due to the gaps G2 of the second gap portions is fabricated. Then, the element piece 740A and the cantilever section 101A are joined to each other and unnecessary connection portions 74a to 74d are removed, whereby the physical quantity detection device is obtained.

By this configuration, it is possible to provide the physical quantity detection device (the physical quantity detection sensor) having high impact resistance, in which when impact in the X direction is applied, the excessive displacement of the movable section 14 is restricted, and thus breakage of the cantilever section 101A or the physical quantity detection element 70 can be prevented. Further, according to this modification example, the effect that it is possible to accurately make the positional accuracy between the physical quantity detection element 70 and the first gap portion in the element piece 740A is obtained.

Further, as in this modification example, by joining the reinforcing portions 75a and 75b integrally formed at the element piece 740A to predetermined positions of the arm portions 20 as support portions extending from the base section 10 of the cantilever section 101A, it is possible to attain the strengthening of the support structure by the arm portions 20 of the cantilever section 101A.

EXAMPLES

Subsequently, examples of applying the physical quantity detection sensor 100 according to the embodiment of the invention will be described according to the drawings.

Figure 11A:
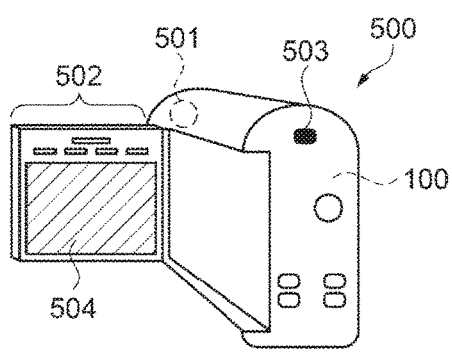
FIG. 11A is a perspective view showing a video camera that is an electronic apparatus equipped with the physical quantity detection sensor.
Figure 11B:
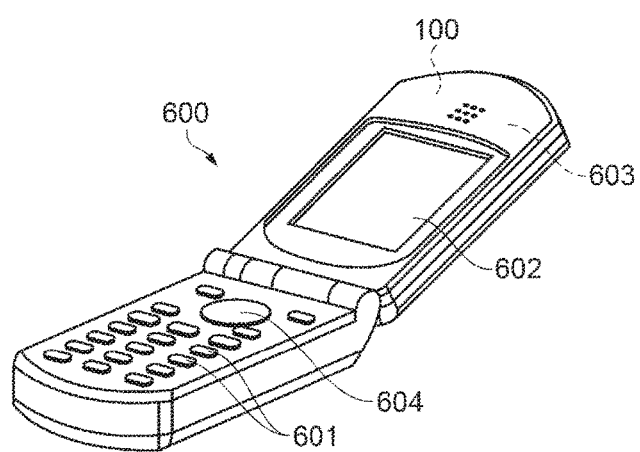
FIG. 11B is a perspective view showing a mobile phone that is an electronic apparatus equipped with the physical quantity detection sensor.
Figure 12:
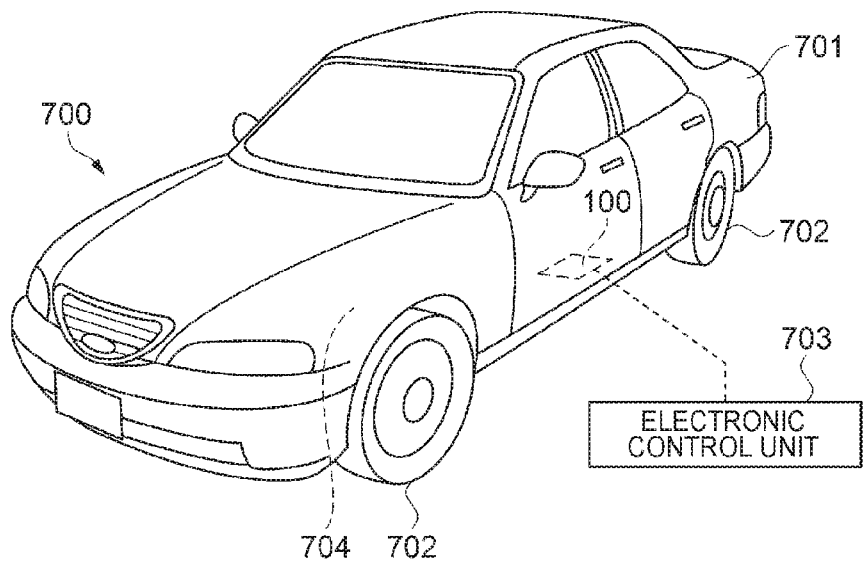
FIG. 12 is a perspective view showing an automobile that is a moving object equipped with the physical quantity detection sensor.

FIG. 11A is a perspective view showing a video camera equipped with the physical quantity detection sensor 100, FIG. 11B is a perspective view showing a mobile phone equipped with the physical quantity detection sensor 100, and FIG. 12 is a perspective view showing an automobile that is a moving object equipped with the physical quantity detection sensor 100.

Electronic Apparatus

As shown in FIGS. 11A and 11B, each of a video camera 500 and a mobile phone 600 as an electronic apparatus is equipped with the physical quantity detection sensor 100 according to this embodiment.

First, the video camera 500 shown in FIG. 11A is equipped with an image receiving section 501, an operating section 502, an audio input section 503, and a display unit 504. The video camera 500 is provided with the physical quantity detection sensor 100, and for example, if the video camera 500 is provided with three physical quantity detection sensors 100, it is possible to exhibit a function of detecting physical quantities, for example, acceleration, inclination, or the like, in three directions of the X-axis, the Y-axis, and the Z-axis (not shown), and thereby correcting camera shake or the like. In this way, the video camera 500 can record a clear moving image.

Further, the mobile phone 600 shown in FIG. 11B is equipped with a plurality of operation buttons 601, a display unit 602, a camera mechanism 603, and a shutter button 604 and functions as a phone and a camera. The mobile phone 600 is equipped with the physical quantity detection sensor 100, and for example, if the mobile phone 600 is equipped with three physical quantity detection sensors 100, it is possible to exhibit a function of detecting physical quantities, for example, acceleration, inclination, or the like, in three directions of the X-axis, the Y-axis, and the Z-axis (not shown), and thereby correcting camera shake or the like of the camera mechanism 603. In this way, the mobile phone 600 can record a clear image by the camera mechanism 603.

The physical quantity detection sensor 100 according to the embodiment of the invention can be applied, in addition to the video camera of FIG. 11A and the mobile phone of FIG. 11B, to an electronic apparatus such as a personal computer (a mobile type personal computer), a digital still camera, an ink jet type discharge apparatus (for example, an ink jet printer), a television, a video recorder, a car navigation device, a pager, an electronic notebook (also including that with a communication function), an electronic dictionary, a desk calculator, an electronic game apparatus, a word processor, a workstation, a videophone, a security television monitor, electronic binoculars, a POS terminal, a medical apparatus (for example, an electronic thermometer, a sphygmomanometer, a blood glucose meter, an electrocardiogram measuring device, an ultrasound diagnostic device, an electronic endoscope), a fishfinder, various measurement apparatuses, meters and gauges (for example, meters and gauges of a vehicle, an aircraft, and a ship), and a flight simulator, for example.

Moving Object

Next, a moving object using the physical quantity detection sensor 100 will be described. As shown in FIG. 12, a moving object 700 is an automobile and is equipped with the physical quantity detection sensor 100. In the moving object 700, the physical quantity detection sensor 100 is built into an electronic control unit (ECU) 703 mounted on a car body 701. For example, the physical quantity detection sensor 100 detects the state of the car body 701 as an acceleration sensor or an inclination sensor, whereby the electronic control unit 703 grasps the attitude, the moving status, or the like of the moving object 700 and can accurately perform the control of suspensions 704, tires 702, and the like. In this way, the moving object 700 can perform a safe and stable movement.

Further, the physical quantity detection sensor 100 can be mounted, in addition to being mounted on the electronic apparatus or the moving object described above, on a keyless entry, an immobilizer, a car navigation system, a car air conditioner, an antilock brake system (ABS), an air bag, a tire pressure monitoring system (TPMS), an engine control, a battery monitor of a hybrid vehicle or an electric vehicle, or an electronic control unit such as a car body attitude control system, and thus the physical quantity detection sensor 100 is applicable to a wide range of fields.

The embodiment of the invention made by the inventor has been specifically described above. However, the invention is not limited to the embodiment described above, and it is possible to add various changes thereto within a scope which does not depart from the gist of the invention.

The entire disclosure of Japanese Patent Application No. 2015-256059 filed Dec. 28, 2015 is expressly incorporated by reference herein.

What is claimed is:

1. A sensor that includes a substrate for a sensor comprising:
    a base section;
    a movable section connected to the base section;
    a support portion which extends along the movable section from the base section when viewed in a planar view as viewed from a thickness direction of the movable section;
    a first gap portion having a protrusion portion in which one of the movable section and the support portion protrudes toward the other of the movable section and the support portion when viewed in the planar view, and having a predetermined gap between the protrusion portion on one side and the other of the movable section and the support portion; and
    a second gap portion which is located further toward the base section side than the first gap portion when viewed in the planar view and has a gap wider than the predetermined gap,
    wherein in the first gap portion, the protrusion portion has a ridge portion on the side facing the first gap portion when viewed in a cross-section perpendicular to an extension direction of the support portion.

2. The sensor that includes the substrate for a sensor according to claim 1, wherein the support portions are disposed on both sides with the movable section interposed therebetween, when viewed in the planar view,
- the first gap portions and the second gap portions are provided on both sides with the movable section interposed therebetween, and
- the respective protrusion portions protrude in the same direction when viewed in the planar view.

3. A physical quantity detection sensor comprising:
the substrate for a sensor according to claim 2; and
a physical quantity detection element which has one end portion fixed to the base section and the other end portion fixed to the movable section and detects a physical quantity.

4. An acceleration sensor comprising:
the physical quantity detection sensor according to claim 3,
wherein acceleration is measured by the physical quantity detection sensor.

5. An electronic apparatus comprising:
the physical quantity detection sensor according to claim 3.

6. A moving object comprising:
the physical quantity detection sensor according to claim 3.

7. The sensor that includes the substrate for a sensor according to claim 1, wherein the ridge portion is provided at substantially the center of a cross-section of the protrusion portion.

8. A physical quantity detection sensor comprising:
the substrate for a sensor according to claim 7; and
a physical quantity detection element which has one end portion fixed to the base section and the other end portion fixed to the movable section and detects a physical quantity.

9. An acceleration sensor comprising:
the physical quantity detection sensor according to claim 8,
wherein acceleration is measured by the physical quantity detection sensor.

10. An electronic apparatus comprising:
the physical quantity detection sensor according to claim 8.

11. A moving object comprising:
the physical quantity detection sensor according to claim 8.

12. The sensor that includes the substrate for a sensor according to claim 1, wherein the ridge portion exhibits a trapezoidal shape in which a width narrows toward the tip portion side from the base end portion side of the movable section or the support portion when viewed in the planar view.

13. A physical quantity detection sensor comprising:
the substrate for a sensor according to claim 12; and
a physical quantity detection element which has one end portion fixed to the base section and the other end portion fixed to the movable section and detects a physical quantity.

14. The sensor that includes the substrate for a sensor according to claim 1, wherein a quartz crystal Z-cut plate cut out in a Z-cut is used.

15. The sensor that includes the substrate for a sensor according to claim 14, wherein the protrusion portion protrudes in a +X crystal axis direction of the quartz crystal Z-cut plate.

16. The sensor that includes the substrate for a sensor according to claim 1, wherein a second gap length that is a length in a direction intersecting a gap width direction of the second gap portion is longer than a first gap length that is a length in a direction intersecting a gap width direction of the first gap portion.

17. A physical quantity detection sensor comprising:
the substrate for a sensor according to claim 1; and
a physical quantity detection element which has one end portion fixed to the base section and the other end portion fixed to the movable section and detects a physical quantity.

18. An acceleration sensor comprising:
the physical quantity detection sensor according to claim 17,
wherein acceleration is measured by the physical quantity detection sensor.

19. An electronic apparatus comprising:
the physical quantity detection sensor according to claim 17.

20. A moving object comprising:
the physical quantity detection sensor according to claim 17.

* * * * *